(12) United States Patent
Chang et al.

(10) Patent No.: US 9,303,749 B2
(45) Date of Patent: *Apr. 5, 2016

(54) VEHICLE POWER SWITCHING DEVICE

(71) Applicant: KWANG YANG MOTOR CO., LTD., Kaohsiung (TW)

(72) Inventors: Chi-Han Chang, Kaohsiung (TW); Chao-Chang Ho, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/536,306

(22) Filed: Nov. 7, 2014

(65) Prior Publication Data
US 2015/0065284 A1  Mar. 5, 2015
US 2015/0316133 A2  Nov. 5, 2015

Related U.S. Application Data

(62) Division of application No. 13/183,144, filed on Jul. 14, 2011, now Pat. No. 8,900,081.

(30) Foreign Application Priority Data

Jul. 14, 2010 (TW) .............................. 99123153 A
Jul. 14, 2010 (TW) .............................. 99123155 A

(51) Int. Cl.
*F16H 48/24* (2006.01)
*F16H 48/34* (2012.01)
*B60K 17/16* (2006.01)
*B60K 17/346* (2006.01)
*B60K 23/04* (2006.01)

(52) U.S. Cl.
CPC ................ *F16H 48/34* (2013.01); *B60K 17/16* (2013.01); *B60K 17/346* (2013.01); *B60K 23/04* (2013.01); *F16H 48/24* (2013.01); *B60K 2023/046* (2013.01)

(58) Field of Classification Search
CPC ................................. F16H 48/20; F16H 48/24
USPC .......................................... 475/150, 230, 231
See application file for complete search history.

(56) References Cited

U.S. PATENT DOCUMENTS 4,271,722 A * 6/1981 Campbell ........................ 475/86
2012/0015773 A1 * 1/2012 Chang et al. .................. 475/150

* cited by examiner

*Primary Examiner* — Robert Hodge
*Assistant Examiner* — Ryan Dodd
(74) *Attorney, Agent, or Firm* — Hunton & Williams LLP

(57) ABSTRACT

A power switching device includes a power transmission unit and a driving unit. The transmission unit includes a differential, an axle aligned with the differential, and a coupler sleeved movably on one of the differential and the axle. The driving unit includes a controller, a first transmission mechanism driven by the controller, and a second transmission mechanism driven by the first transmission mechanism. The controller is a solenoid or an electric actuator, and is operable to activate the second transmission mechanism. The coupler can be moved by the second transmission mechanism to interconnect the differential and the axle, so as to allow for co-rotation of the axle with the differential.

7 Claims, 16 Drawing Sheets

VEHICLE POWER SWITCHING DEVICE

CROSS-REFERENCE TO RELATED APPLICATION

This application This patent application is a divisional of U.S. patent application Ser. No. 13/183,144, filed Jul. 14, 2011, the disclosure of which is hereby incorporated by reference in its entirety. It also claims priority of Taiwanese Application No. 099123153, filed on Jul. 14, 2010, and Taiwanese Application No. 099123155, filed on Jul. 14, 2010.

BACKGROUND OF THE INVENTION

1. Field of the Invention

This invention relates to a power switching device, and more particularly to vehicle power switching device.

2. Description of the Related Art

Referring to FIG. 1, a transmission system disclosed in U.S. Pat. No. 7,018,317 is used in a vehicle, such as an all-terrain vehicle (ATV), and includes a controller 100, a first-coupler pushing member 102 driven by the controller 100, an input shaft (or driving shaft) 11, an output shaft 12 (or driven shaft) 12, a first sliding block 13 (or coupler), and a differential 14 driven by the output shaft 12 to interconnect a left axle 15 and a right axle 16 so as to allow for co-rotation of the left and right axles 15, 16. The first sliding block 13 is sleeved movably on the output shaft 12. When the first sliding block 13 is moved to a four-wheel drive position, a portion of the first sliding block 13 is moved onto the input shaft 11, so that the vehicle is in a four-wheel drive mode. When the portion of the first sliding block 13 is not moved onto the input shaft 11, the first sliding block 13 is at a two-wheel drive position whereat the vehicle is in a two-wheel drive mode. As such, through operation of the controller 100, the vehicle is convertible between the four-wheel drive mode and the two-wheel drive mode.

Due to the function of the differential 14, the left and right axles 15, 16 can rotate at different speeds to facilitate turn of the vehicle. However, if one of the left and right axles 15, 16 drops into a sandy or muddy road surface, different speeds of the left and right axles 15, 16 will result in difficulties in removing the one of the left and right axles 15, 16 from the road surface. At this time, to remove the one of the left and right axles 15, 16 from the road surface, it is necessary to lock the differential 14 to allow for co-rotation of the left and right axles 15, 16.

To lock the differential 14, an actuator (not shown) is operated to pull a cable 144 to thereby move a shaft 141 downwardly. Hence, a second-coupler pushing member 142 on the shaft 141 moves a portion of a second sliding block 143 from the left axle 15 onto the right axle 16, thereby allowing for co-rotation of the left and right axles 15, 16.

The aforesaid conventional transmission system suffers from the following disadvantages:

1. Difficult Control:

The differential 14 is locked by pulling the cable 144 to move the shaft 141, the second-coupler pushing member 142, and the second sliding block 143. The vehicle can be changed between the four-wheel drive mode and the two-wheel drive mode through operation of the controller 100. That is, the differential locking operation and the vehicle mode changing operation are performed by operating two different members, thereby resulting in difficult control on the transmission system.

2. Unsteady Locking:

Although the shaft 141 and the second-coupler pushing member 142 can be moved by pulling the cable 144, typically, they are not moved during an initial small-distance pulling movement of the cable 144. As a result, the displacement amount of the second sliding block 143 is insufficient to lock the differential 14 effectively. To compensate for such insufficiency, a sensor 143 can be provided to detect the position of the second sliding block 143, thereby increasing the manufacturing costs of the transmission system.

SUMMARY OF THE INVENTION

The object of this invention is to provide a vehicle power switching device that is easy to control, and that includes a differential, which can be locked effectively.

According to an aspect of this invention, there is provided a vehicle power switching device comprising:

a power transmission unit including an input shaft adapted to be driven by a vehicle power to rotate, an output shaft aligned with and spaced apart from the input shaft, a first coupler sleeved movably on one of the input shaft and the output shaft and movable to interconnect the input shaft and output shaft, a differential, an axle aligned with the differential, and a second coupler sleeved movably on one of the differential and the axle and movable to interconnect the differential and the axle; and a driving unit including a controller being one of a solenoid and an electric actuator, a first transmission mechanism driven by the controller, and a second transmission mechanism driven by the first transmission mechanism, the controller being operable to activate the first transmission mechanism to thereby move the first coupler among a two-wheel drive position, a four-wheel drive position, and a differential locking position such that, when the first coupler is at the two-wheel drive position, the first coupler is sleeved on only the one of the input shaft and the output shaft, so that the input shaft is disconnected from the output shaft; when the first coupler is at the four-wheel drive position, the first coupler is sleeved on the input shaft and the output shaft to allow for co-rotation of the input shaft and the output shaft, and the differential is disconnected from the axle; and when the first coupler is moved from the four-wheel drive position to the differential locking position, the second transmission mechanism is driven by the first transmission mechanism to move the second coupler to interconnect the differential and the axle, so as to allow for co-rotation of the axle with the differential.

By operating the controller, the vehicle can be converted among a four-wheel drive mode, a two-wheel drive mode, and a differential locking mode. As such, the vehicle power switching device is easy to control.

According to another aspect of this invention, there is provided a vehicle power switching device comprising:

a power transmission unit including a differential, an axle aligned with the differential, and a coupler sleeved movably on one of the differential and the axle; and a driving unit including a controller, a first transmission mechanism driven by the controller, and a second transmission mechanism driven by the first transmission mechanism, the controller being one of a solenoid and an electric actuator and being operable to activate the first and second transmission mechanisms to thereby move the coupler to interconnect the differential and the axle, so as to allow for co-rotation of the axle with the differential.

Since the coupler is moved as soon as the controller is actuated, the differential can be locked effectively.

BRIEF DESCRIPTION OF THE DRAWINGS

These and other features and advantages of this invention will become apparent in the following detailed description of two preferred embodiments of this invention, with reference to the accompanying drawings, in which.

DETAILED DESCRIPTION OF THE PREFERRED EMBODIMENTS

Figure 1:
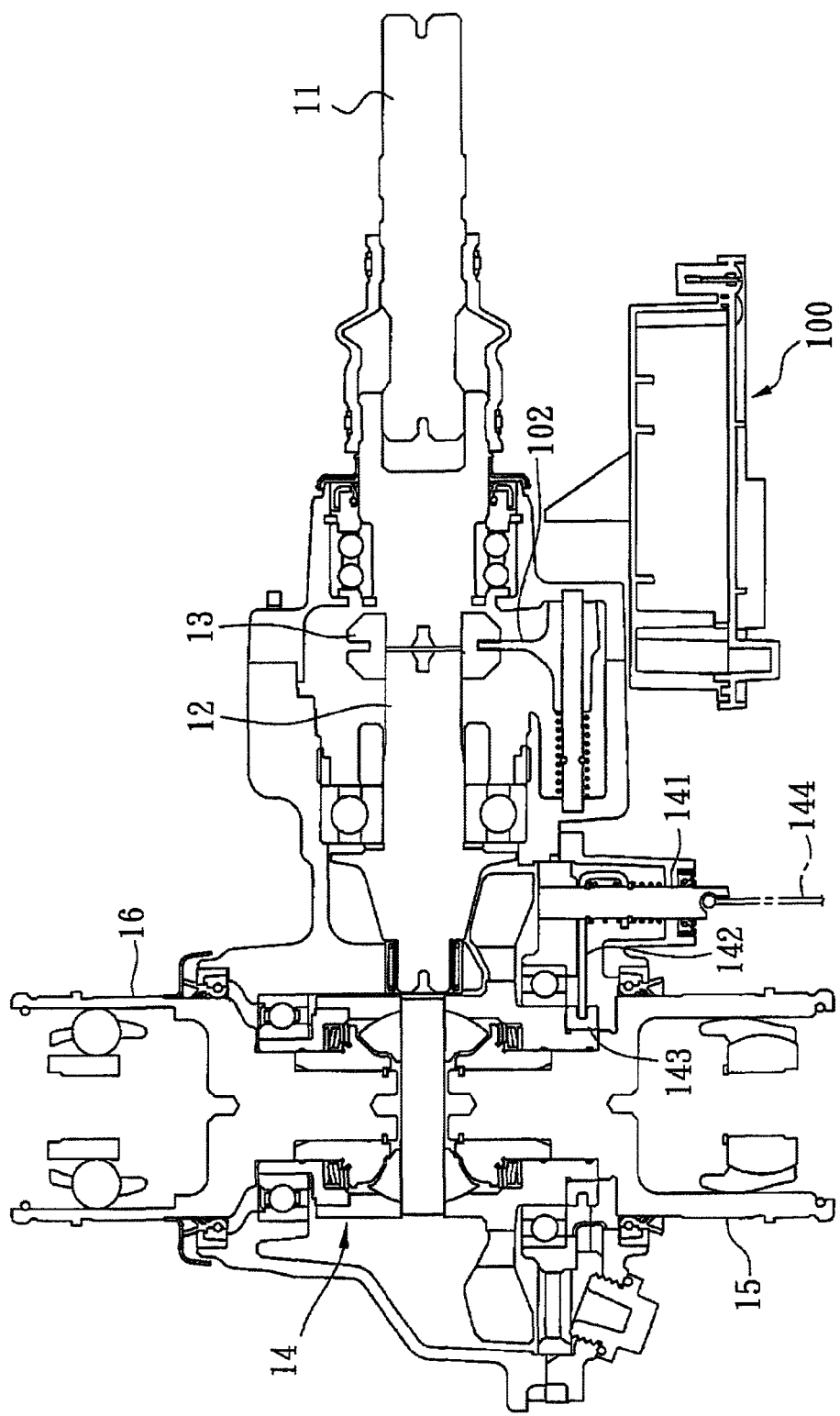
FIG. 1 is a schematic view of a conventional transmission system disclosed in U.S. Pat. No. 7,018,317.

Before the present invention is described in greater detail in connection with the preferred embodiments, it should be noted that similar elements and structures are designated by like reference numerals throughout the entire disclosure.

Figure 2:
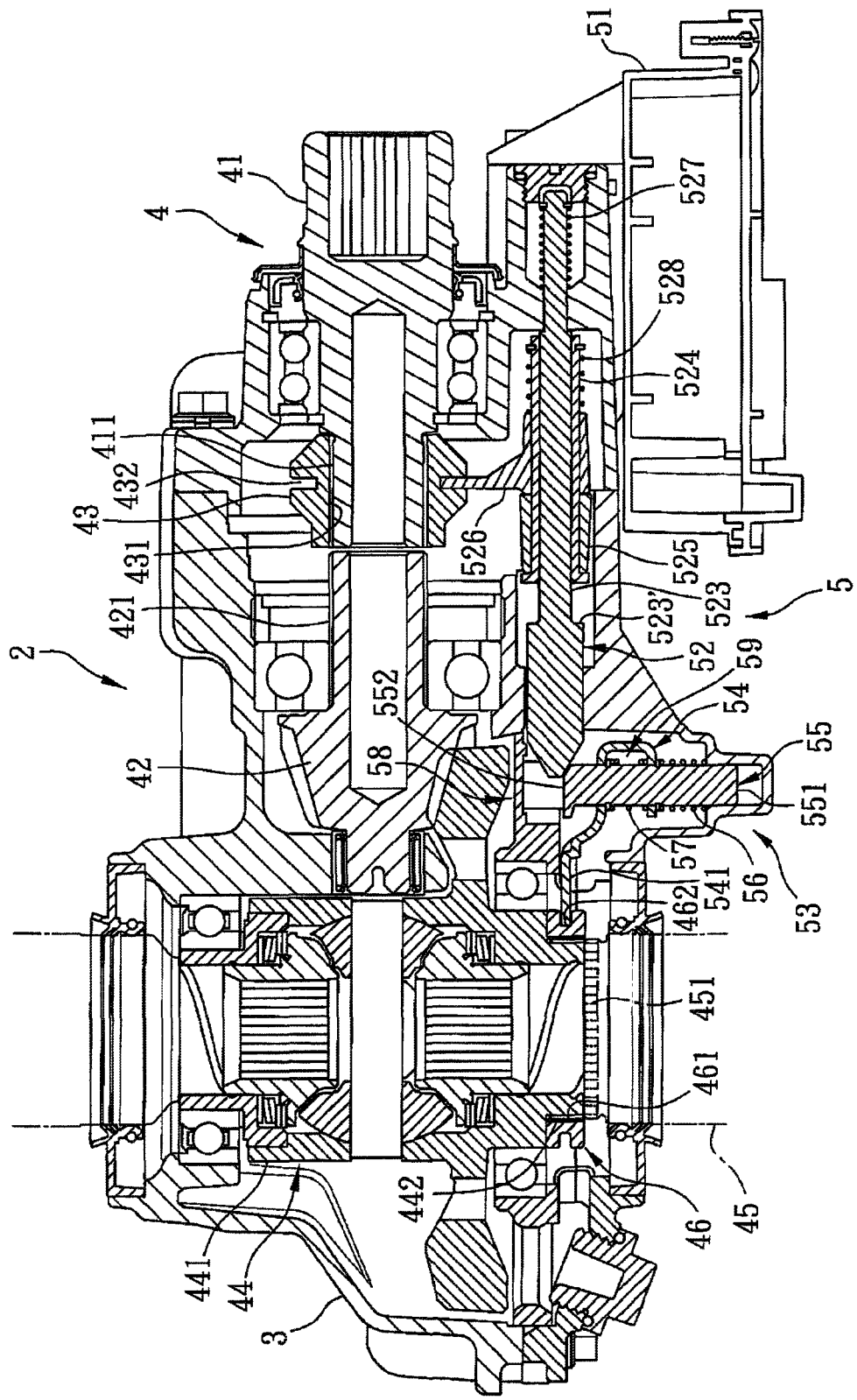
FIG. 2 is a sectional view of the first preferred embodiment of a vehicle power switching device according to this invention when a first coupler is at a two-wheel drive position.

Referring to FIG. 2, the first preferred embodiment of a vehicle power switching device 2 according to this invention is used for a vehicle (not shown), and includes an outer housing 3, a power transmission unit 4, and a driving unit 5.

The power transmission unit 4 includes an input shaft 41 driven by a vehicle power to rotate, an output shaft 42 aligned with and spaced apart from the input shaft 41, a first coupler 43 sleeved movably on the input shaft 41, a differential 44 driven by the output shaft 42 in a known manner, an axle 45 aligned with the differential 44, and a second coupler 46 sleeved movably on the differential 44 and movable to interconnect the differential 44 and the axle 45.

The input shaft 41 has an externally splined portion 411. The output shaft 42 has an externally splined portion 421. The first coupler 43 has an internally splined portion 431 engageable with the externally splined portions 411, 421 of the input shaft 41 and the output shaft 42.

The differential 44 has a barrel 441 formed with an externally splined portion 442. The axle 45 is aligned with the barrel 441, and has an externally splined portion 451. The second coupler 46 has an internally splined portion 461 engageable with the externally splined portions 442, 451 of the barrel 441 and the axle 45, and an annular retaining groove 462.

Figure 3:
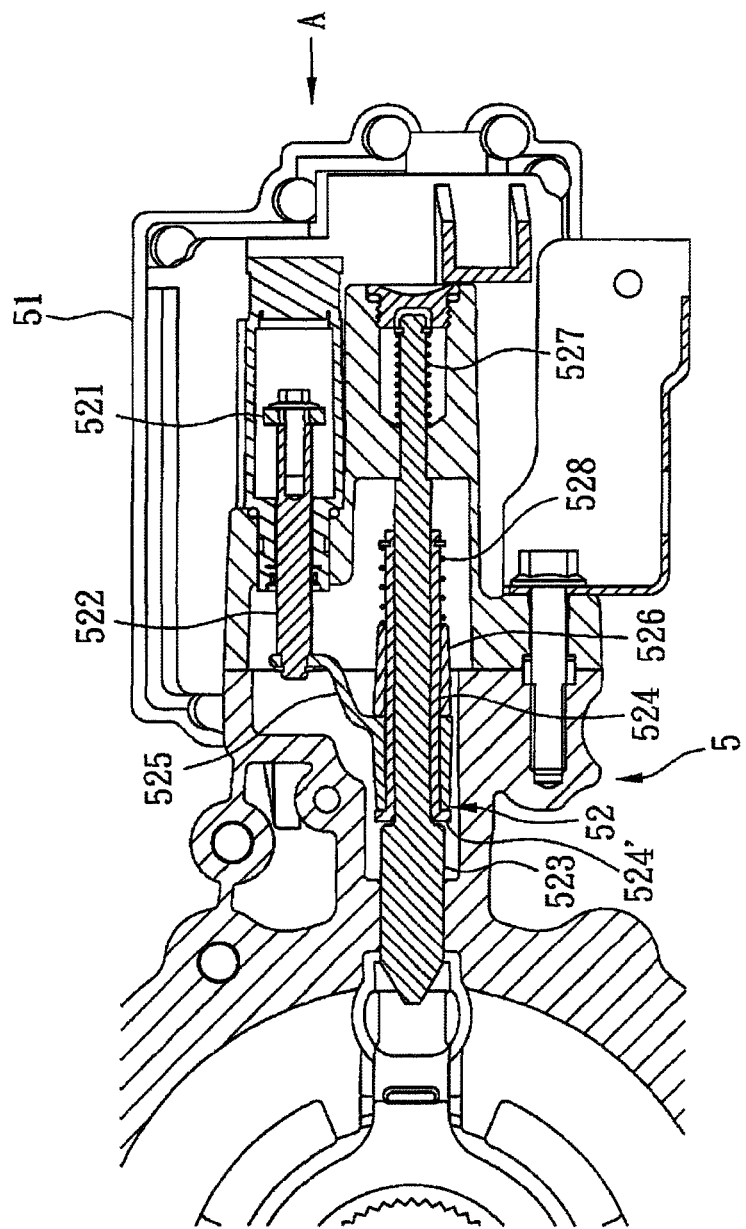
FIG. 3 is a sectional view of a controller and a first transmission mechanism of the first preferred embodiment.

With further reference to FIG. 3, the driving unit 5 includes a controller 51, a first transmission mechanism 52 driven by the controller 51, a second transmission mechanism 53 driven by the first transmission mechanism 52, a guiding mechanism 58, and a positioning unit 59. The controller 61 is a solenoid (e.g., that disclosed in U.S. Pat. No. 7,018,317) or an electric actuator.

The first transmission mechanism 52 includes a movable rod 521 driven by the controller 51, a driving rod 522 permitting the movable rod 521 to be inserted into and connected fixedly to an end thereof, a push rod 523 spaced apart from the driving rod 522 and movable to activate the second transmission mechanism 53, a sleeve 524 permitting the push rod 523 to extend therethrough, a sleeve-pushing member 525 disposed fixedly on the driving rod 522 and sleeved rotatably on the sleeve 524, a first-coupler pushing member 526 sleeved movably on the sleeve 524 and connected to and co-movable with the first coupler 43, a first returning member 527 sleeved on the push rod 523 for biasing the push rod 523 to its original position, and a force-storing resilient member 528 sleeved on the sleeve 524 for biasing the first-coupler pushing member 526 and the sleeve-pushing member 527 on the sleeve 524 toward an end flange 524' (see FIG. 3) of the sleeve 524 to thereby move the sleeve 524 on the push rod 523 toward a shoulder 523' (see FIG. 3) of the push rod 523.

In this embodiment, the controller 51 is an electric actuator, and includes a stepping motor (not shown) connected to the movable rod 521 and operable to move the movable rod 521. The first-coupler pushing member 526 is configured as a fork inserted into an annular groove 432 (see FIG. 2) in the first coupler 43. The first returning member 527 and the force-storing resilient member 528 are configured as coiled compression springs.

The second transmission mechanism 53 includes a second-coupler pushing member 54 configured as a fork and inserted into an annular groove 462 (see FIG. 2) in the second coupler 46 so as to co-move with the second coupler 46, a connecting rod 55 driven by the push rod 523 to move the second-coupler pushing member 54, a second returning member 56 sleeved on the connecting rod 55 for biasing the connecting rod 55 to its original position, and a prepressing resilient member 57 sleeved on the connecting rod 55 for biasing the second coupler 46 to interconnect the differential 44 and the axle 45. In this embodiment, the second returning member 56 and the prepressing resilient member 57 are configured as coiled compression springs.

Figure 4:
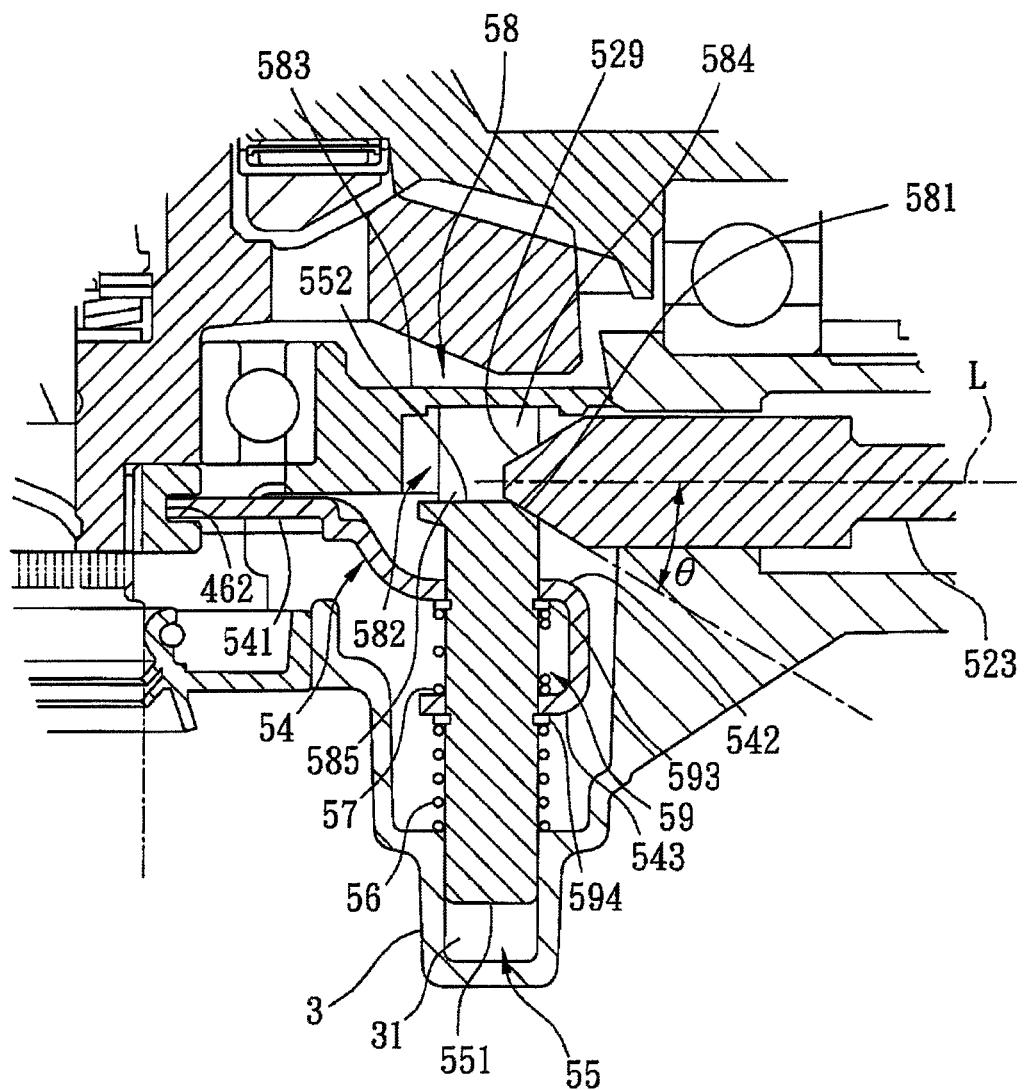
FIG. 4 is a sectional view of a guiding mechanism and a positioning unit of the first preferred embodiment.
Figure 5:
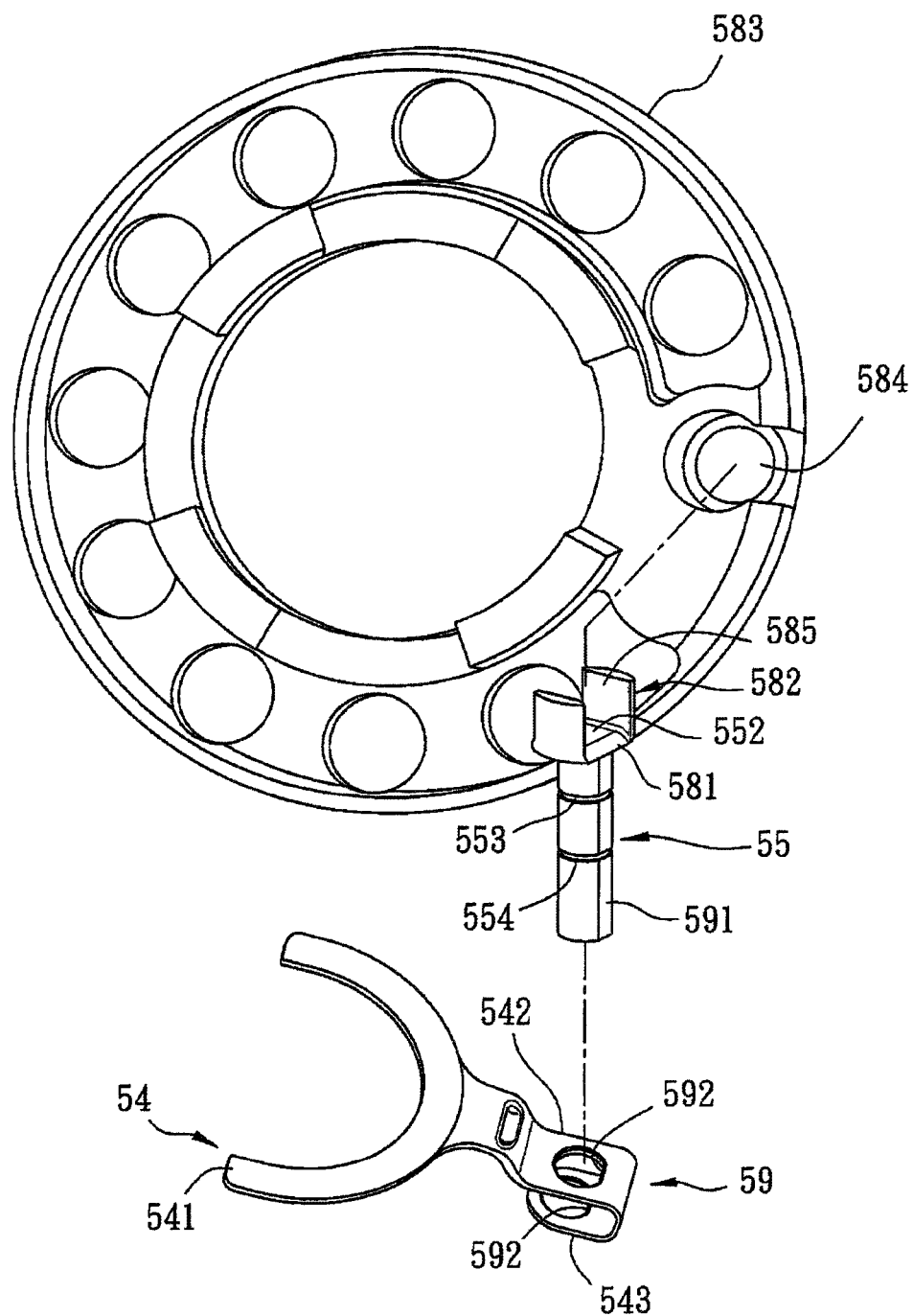
FIG. 5 is an exploded perspective view of the guiding mechanism and the positioning unit of the first preferred embodiment.

With further reference to FIGS. 4 and 5, the push rod 523 is perpendicular to the connecting rod 55, and has a driving end portion 529. The connecting rod 55 has a positioning end 551 (see FIG. 2) extending into a circular hole 31 (see FIG. 4) in the outer housing 3 and distal from the driving end portion 529 of the push rod 523, and a driven end 552 (see FIG. 2) opposite to the positioning end 551 and proximate to the driving end portion 529. The second-coupler pushing member 54 has a curved insert portion 541 engaging the annular groove 462 in the second coupler 46, and a U-shaped plate section having a connecting plate portion 542 connected to the insert portion 541, and a distal plate portion 543 generally parallel to the connecting plate portion 542. The connecting rod 55 extends movably through the connecting plate portion 542 and the distal plate portion 543.

The guiding mechanism 58 includes at least one guiding surface 581 disposed at one of the driving end portion 529 of the push rod 523 and the driven end 552 of the connecting rod 55 and contactable with the other one of the driving end portion 529 and the driven end 552, such that the push rod 523 can push and move the connecting rod 55 along a longitudinal direction of the connecting rod 55. In this embodiment, the guiding mechanism 58 includes two inclined guiding surfaces 581 (see FIG. 4) disposed respectively at the driving end portion 529 and the driven end 552, and the driving end portion 529 is frustoconical. The guiding mechanism 58 further includes two spaced-apart guiding portions 582 extending from the driven end 552 away from the positioning end 551, and a positioning ring 583 disposed around the barrel 441 of the differential 44 and formed with a guiding groove 584 permitting the guiding portions 582 to extend thereinto. The second guiding portions 582 cooperate with the driven end 552 to define an accommodating space 585 permitting the driving end portion 529 to extend thereinto.

Since the positioning end 551 of the connecting rod 55 is confined within the hole 31 in the outer housing 3, and the positioning portions 582 are confined within the guiding groove 584 in the positioning ring 583, the connecting rod 55 is limited to move in the longitudinal direction thereof.

The inclined guiding surface 581 of the driven end 552 forms an angle (θ) smaller than 45° with respect to a central axis (L) (see FIG. 4) of the push rod 523. In this embodiment, the angle (θ) is about 32°.

The positioning unit 59 includes a first positioning flat surface 591 disposed at the connecting rod 55, two second positioning flat surfaces 592 disposed respectively at the connecting plate portion 542 and the distal plate portion 543 of the second-coupler pushing member 54, a first C-shaped retaining ring 593 received within a first annular groove 553 (see FIG. 5) in the connecting rod 55 and disposed between the connecting plate portion 542 and the distal plate portion 543, and a second C-shaped retaining ring 594 received within a second annular groove 554 (see FIG. 5) in the connecting rod 55 and disposed between the distal plate portion 533 and the circular hole 31 in the outer housing 3. The second positioning flat surfaces 592 of the second-coupler pushing member 54 are parallel to and in slidable contact with the first positioning flat surface 591 of the connecting rod 55 for preventing rotation of the connecting rod 55 relative to the second-coupler pushing member 54. Alternatively, the positioning unit 59 may include only one second positioning flat surface 592, which can achieve the same function as two second positioning flat surfaces 592.

The second returning member 56 has two ends abutting against the second C-shaped retaining ring 594 and the outer housing 3, respectively. The prepressing resilient member 57 has two ends abutting against the first C-shaped retaining ring 593 and the distal plate portion 543, respectively. The second-coupler pushing member 54 is positioned on the connecting rod 55 by the first and second C-shaped retaining rings 593, 594.

Figure 6:
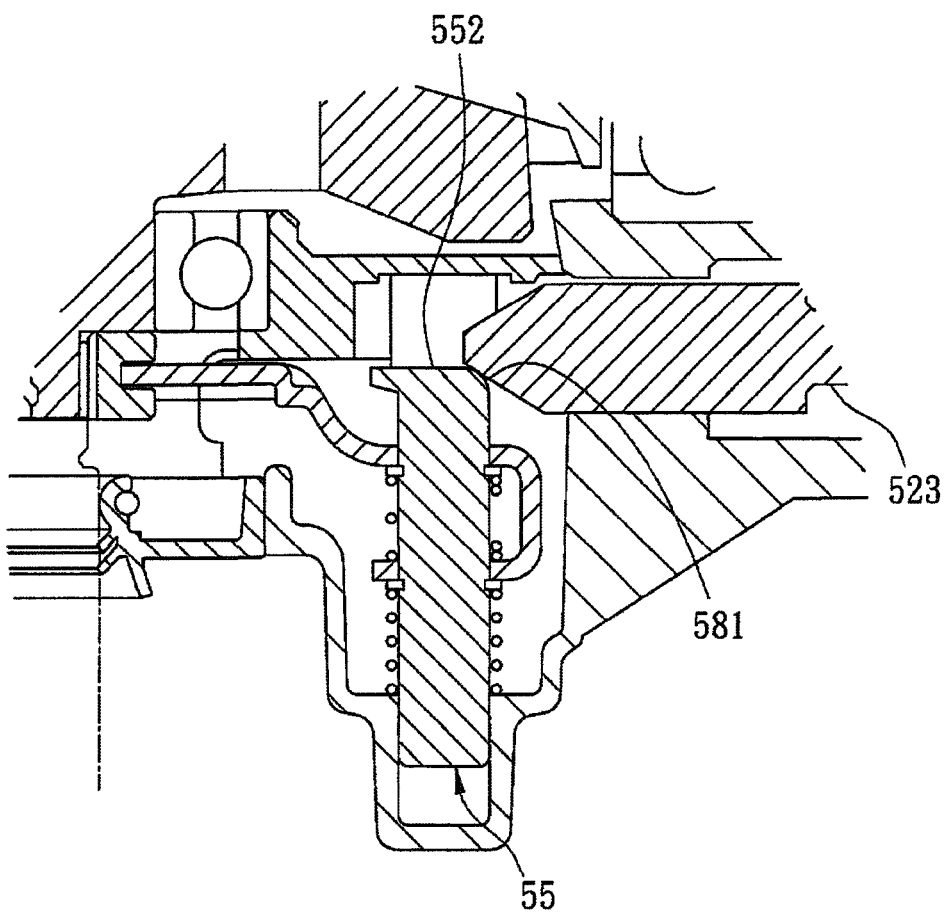
FIGS. 6 to 10 are fragmentary sectional views of the first preferred embodiment, illustrating modified guiding mechanisms.

With further reference to FIG. 6, the guiding surface 581 of the driven end 552 may be curved.

Figure 7:
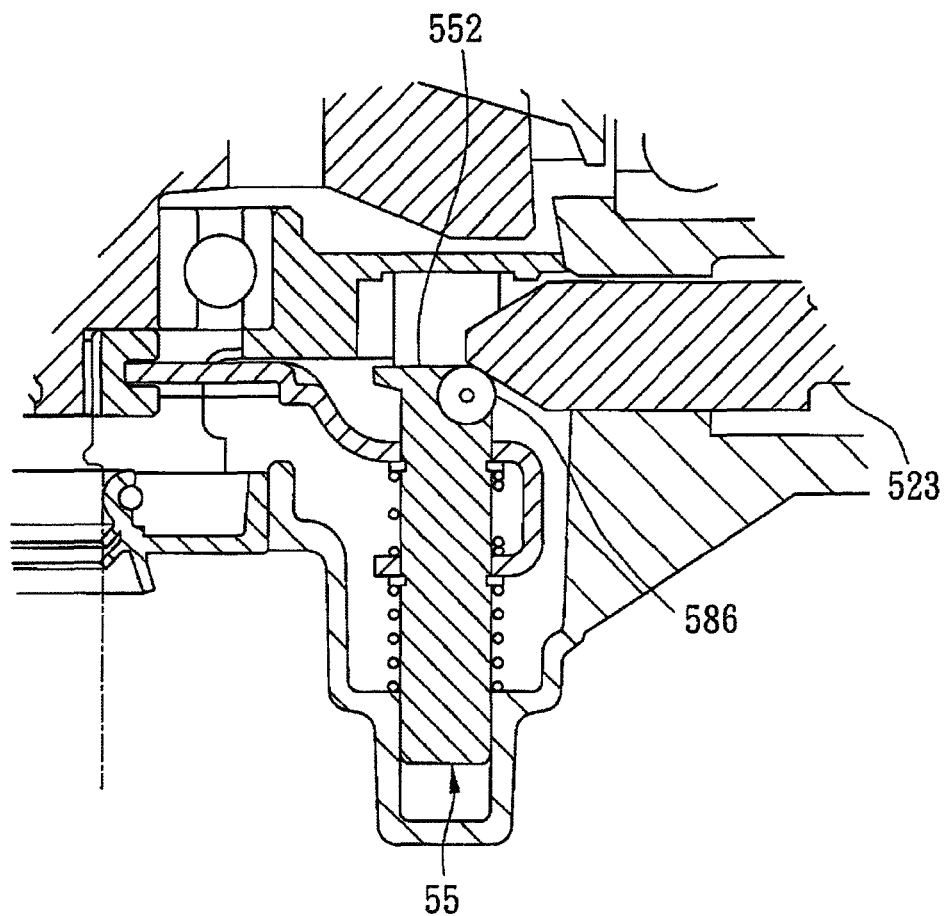

With further reference to FIG. 7, the guiding mechanism 58 may further include a guiding wheel 586 disposed on the driven end 552 and contactable with the frustoconical outer surface of the driving end portion 529.

Figure 8:
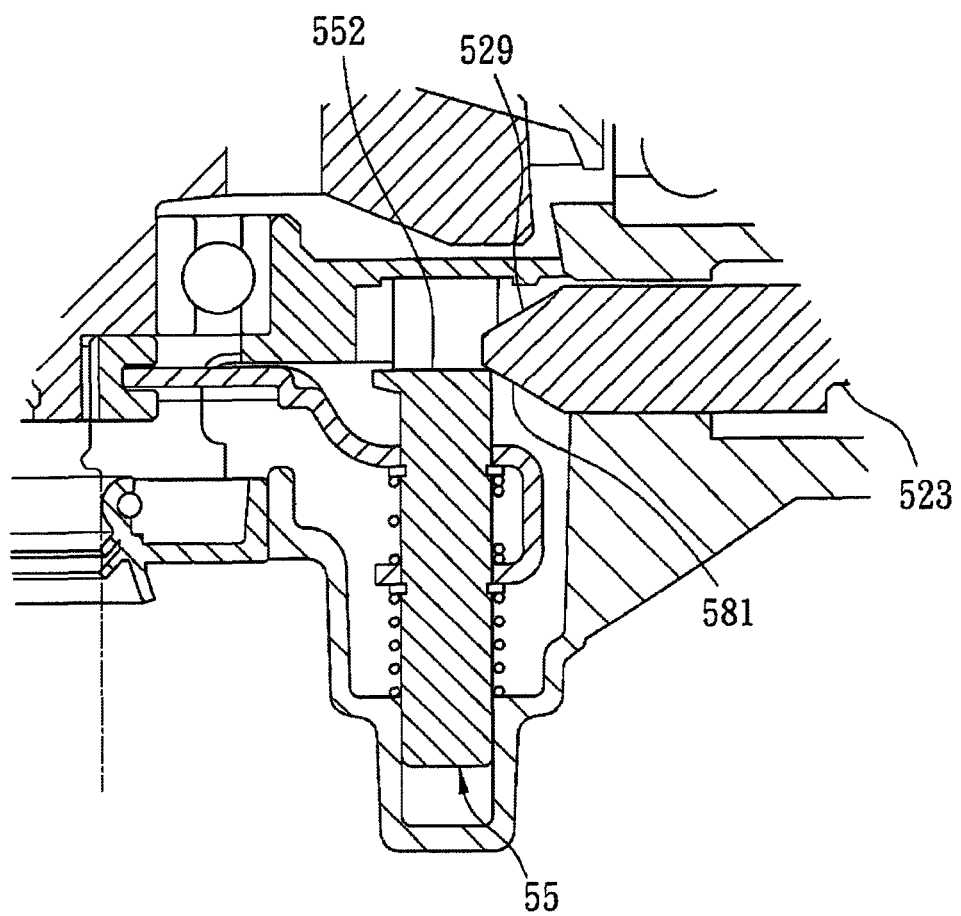
Figure 9:
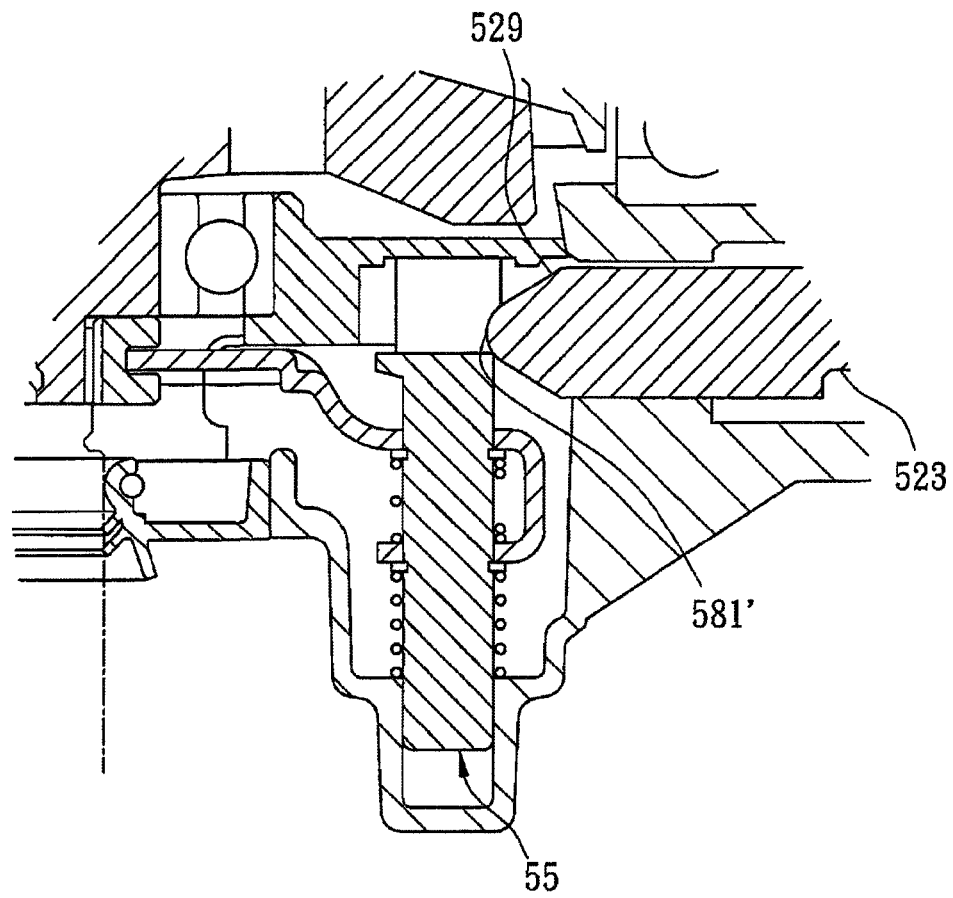
Figure 10:
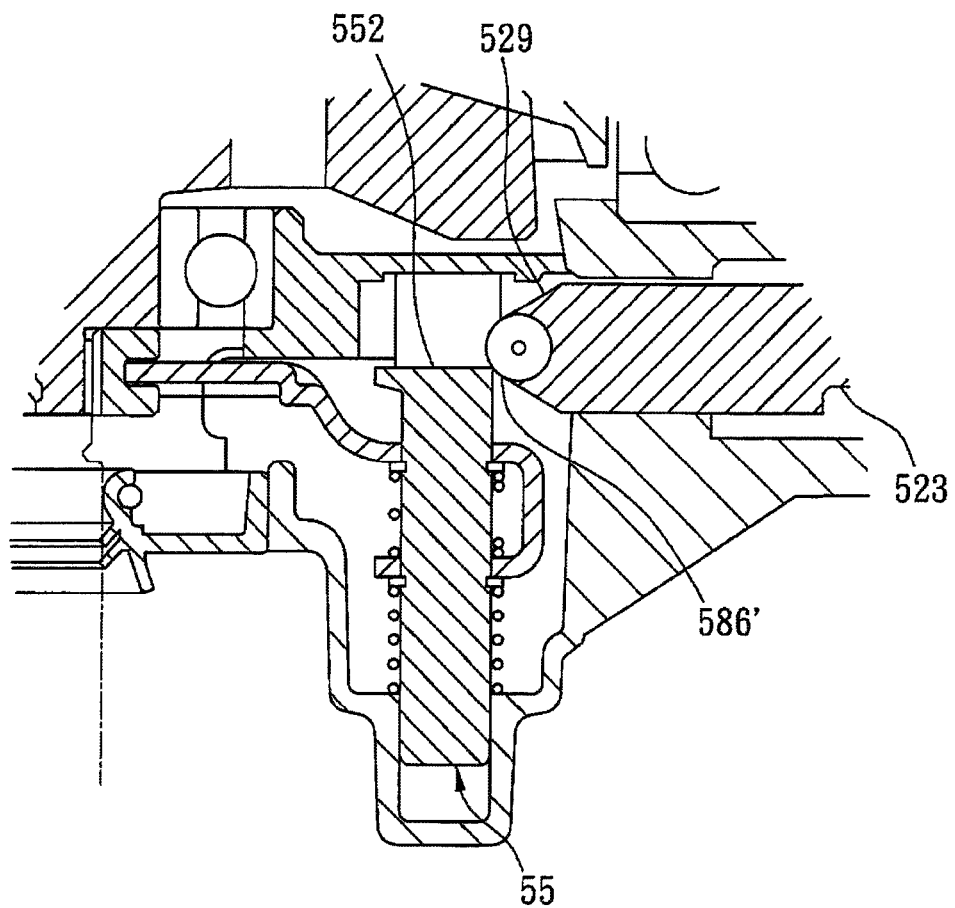

With further reference to FIG. 8, the guiding mechanism 58 may include only one inclined guiding surface 581 disposed at the driving end portion 592, and an end surface of the driven end 552 is flat. If this occurs, the driving end portion 529 may have a curved end surface 581', as shown in FIG. 9, or my be further provided with a guiding roller 586', as shown in FIG. 10, for contact with the driven end 552 of the connecting rod 55.

Figure 11:
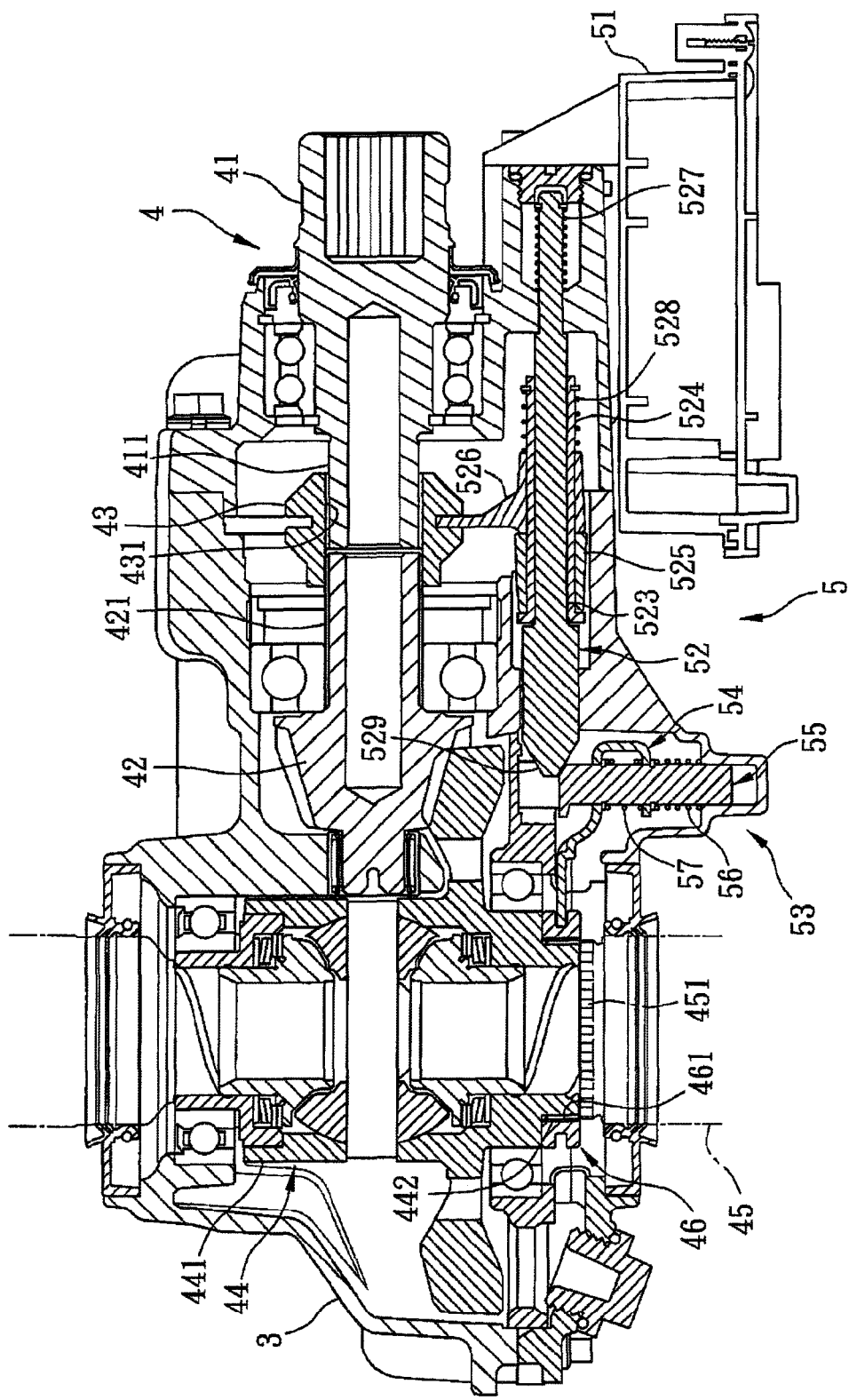
FIG. 11 is a sectional view of the first preferred embodiment, illustrating a four-wheel drive position of the first coupler.
Figure 13:
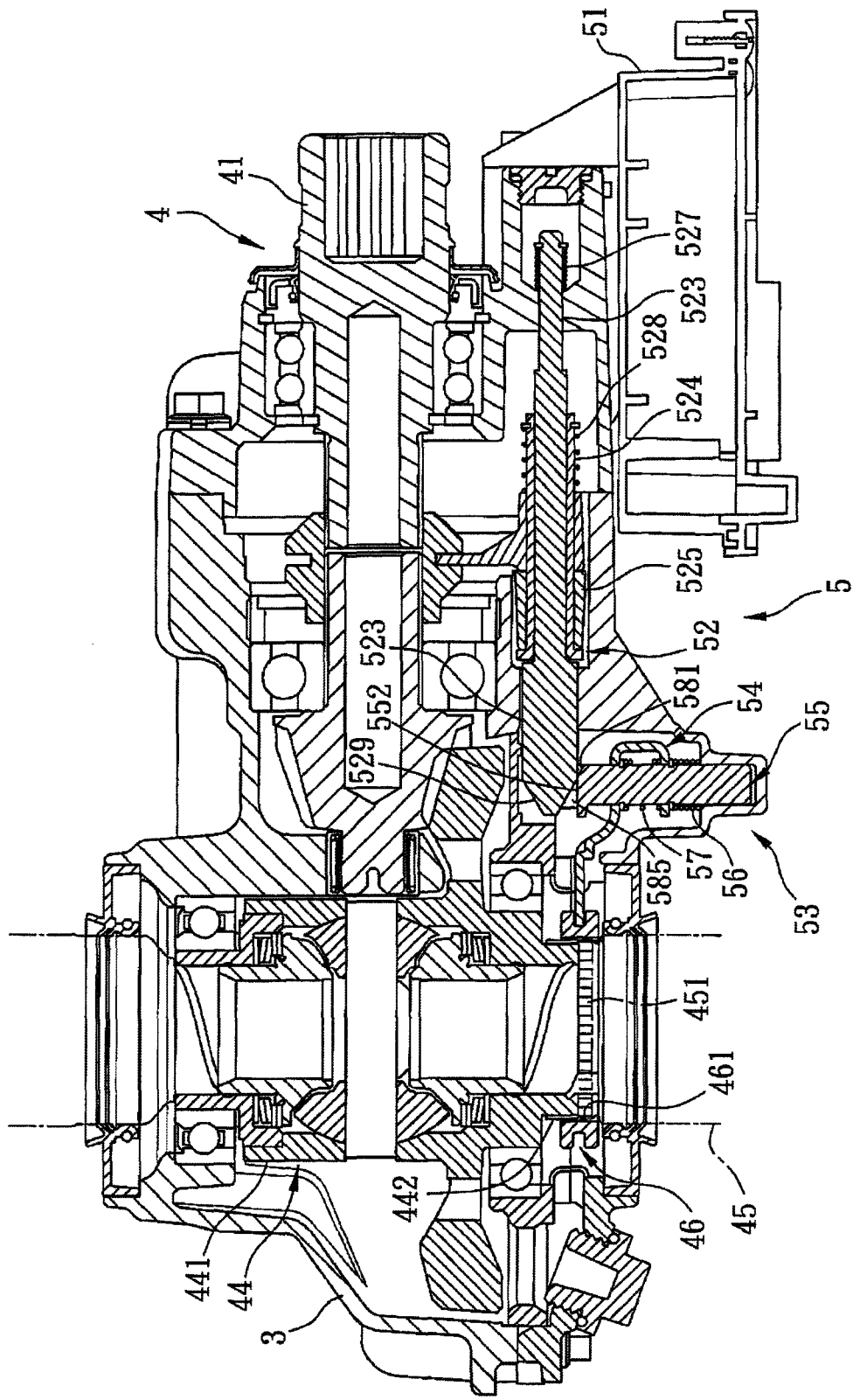
FIG. 13 is a sectional view of the first preferred embodiment, illustrating a differential locking position of the first coupler.

The controller 51 is operable to activate the first transmission mechanism 52 to thereby move the first coupler 43 among a two-wheel drive position shown in FIG. 2, a four-wheel drive position shown in FIG. 11, and a differential locking position shown in FIG. 13. At the two-wheel drive position, the vehicle is in a two-wheel drive mode. At the four-wheel drive position, the vehicle is in a four-wheel drive mode. At the differential locking position, the vehicle is in a differential locking mode, where the differential 44 is locked so as to allow for co-rotation of the differential 44 with the axle 45.

With particular reference to FIG. 2, when the first coupler 43 is at the two-wheel drive position, since it is sleeved on only the input shaft 41, the input shaft 41 is disconnected from the output shaft 42.

Figure 12:
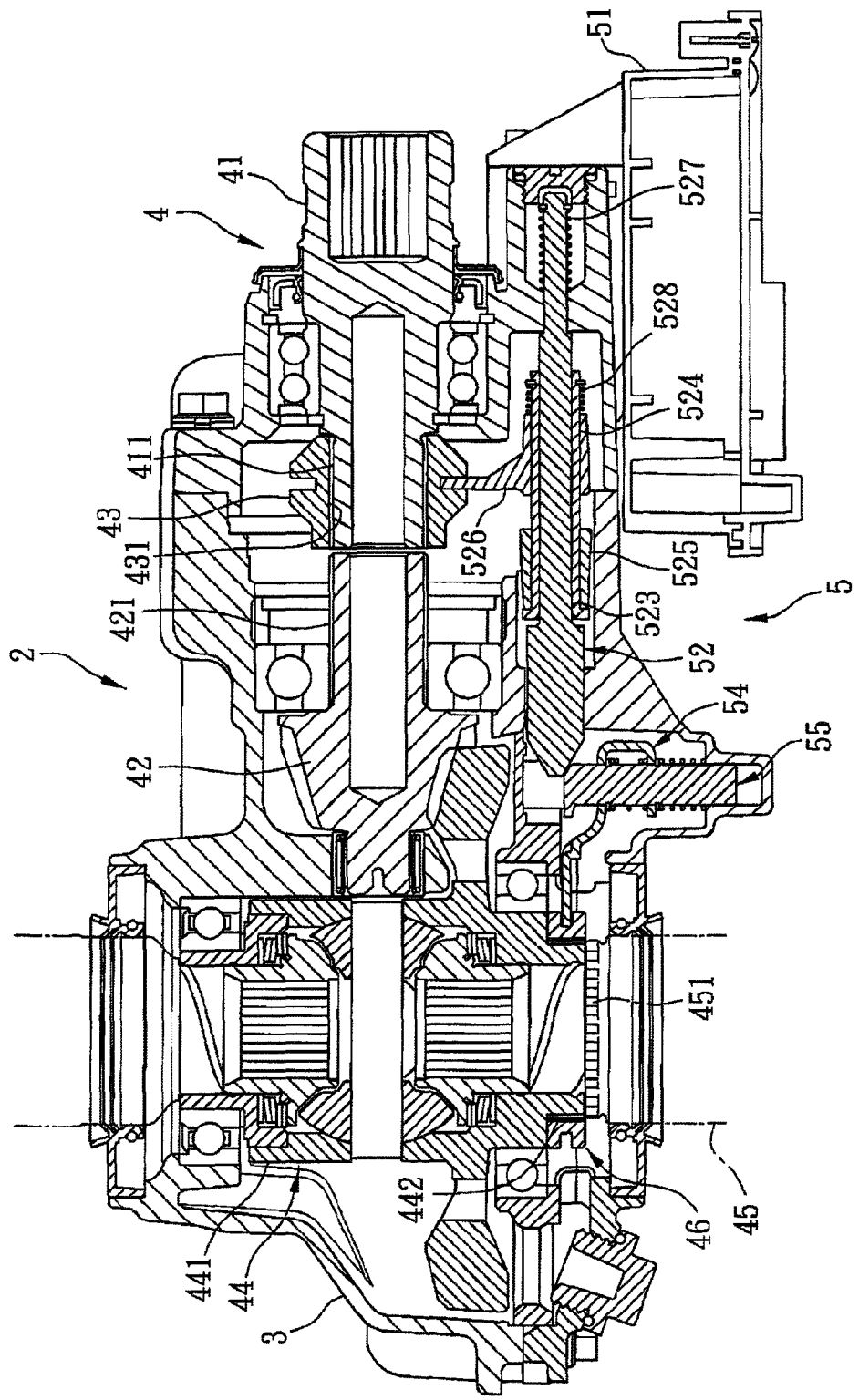
FIG. 12 is a sectional view of the first preferred embodiment, illustrating a compressed state of a force-storing resilient member.

With particular reference to FIGS. 2, 3, and 11, when it is desired to move the first coupler 43 from the two-wheel drive position to the four-wheel drive position during rotation of the input shaft 41, the controller 51 is operated to move the movable rod 521 and the driving rod 522 in a direction (A) (see FIG. 3). At the same time, since the first-coupler pushing member 526 is biased by the force-storing resilient member 528 to press the sleeve-pushing member 525 against the end flange 524' of the sleeve 524, the sleeve-pushing member 525 pushes and moves the sleeve 24 to the position shown in FIG. 12 to thereby separate from the first-coupler pushing member 526, so that the force-storing resilient member 528 is in a compressed state. Subsequently, when the input shaft 41 rotates to an angular position to align splines of an externally splined portion 411 (see FIG. 2) of the input shaft 41 with splines of an externally splined portion 421 (see FIG. 2) of the output shaft 42, respectively, the first-coupler pushing member 526 is biased by the force-storing resilient member 528 to contact and move the sleeve 524 on the push rod 523 to a position shown in FIG. 11 whereat the sleeve 524 is adjacent to the shoulder 523' of the push rod 523. Hence, a portion of the first coupler 43 moves from the input shaft 41 onto the output shaft 42 so as to engage an internally splined portion 431 of the first coupler 43 with the externally splined portions 411, 421 of the input shaft 41 and the output shaft 42. That is to say, the first coupler 43 is moved to the four-wheel drive position.

Figure 14:
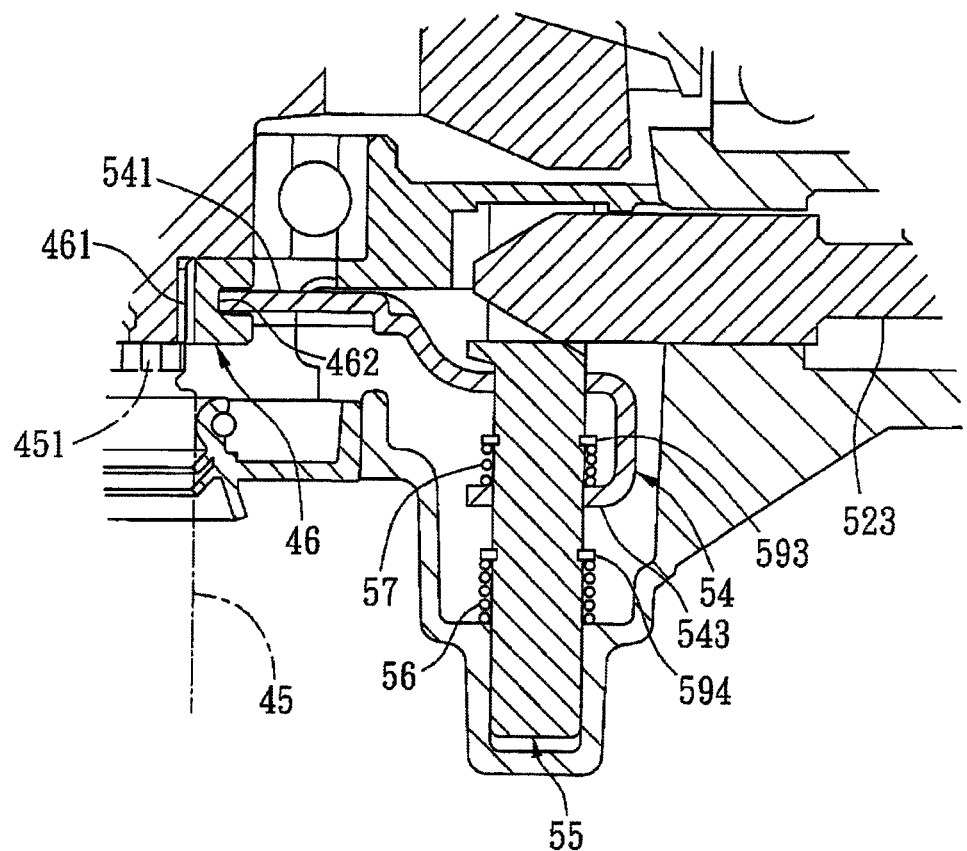
FIG. 14 is a fragmentary sectional view of the first preferred embodiment, illustrating a compressed state of a prepressing resilient member.

With particular reference to FIGS. 3, 11 and 13, when the first coupler 43 is at the four-wheel drive position, the second coupler 46 is sleeved on only the differential 44, so that the differential 44 is disconnected from the axle 45. When it is desired to move the first coupler 43 from the four-wheel drive position to the differential locking position during rotation of the differential 44, the controller 541 is operated to continue to move the movable rod 521, the driving rod 522, the sleeve-pushing member 525, and the first-coupler pushing member 526 in the direction (A), so as to move the first coupler 43 to the differential locking position. Hence, the connecting rod 55 is moved downwardly by the driving end portion 529 of the push rod 523 to a position shown in FIG. 14 whereat the prepressing resilient member 57 and the second returning member 56 are in a compressed state and whereat the second C-shaped retaining ring 594 is spaced apart from the distal plate portion 543. Subsequently, when the differential 44 rotates to an angular position to align splines of an externally splined portion 442 of the differential 44 with splines of an externally splined portion 451 of the axle 45, respectively, the second-coupler pushing member 46 is biased by the prepressing resilient member 57 to move downwardly to thereby move a portion of the second coupler 46 from the differential 44 onto the axle 45, so as to engage an internally splined portion 461 of the second coupler 46 with the externally splined portions 441, 451 of the differential 44 and the axle 45, thereby locking the differential 44 on the axle 45.

The first coupler 43 can be returned from the differential locking position to the four-wheel drive position or from the four-wheel drive position to the two-wheel drive position through operation of the controller 51 and by virtue of the biasing action of the first and second returning members 527, 56.

As such, by simply operating the controller 51, the vehicle can be converted among the two-wheel drive mode, the four-wheel drive mode, and the differential locking mode, thereby resulting in convenience during use of the vehicle power switching device 2. In other words, the power switching device of this invention is easy to control.

Figure 15:
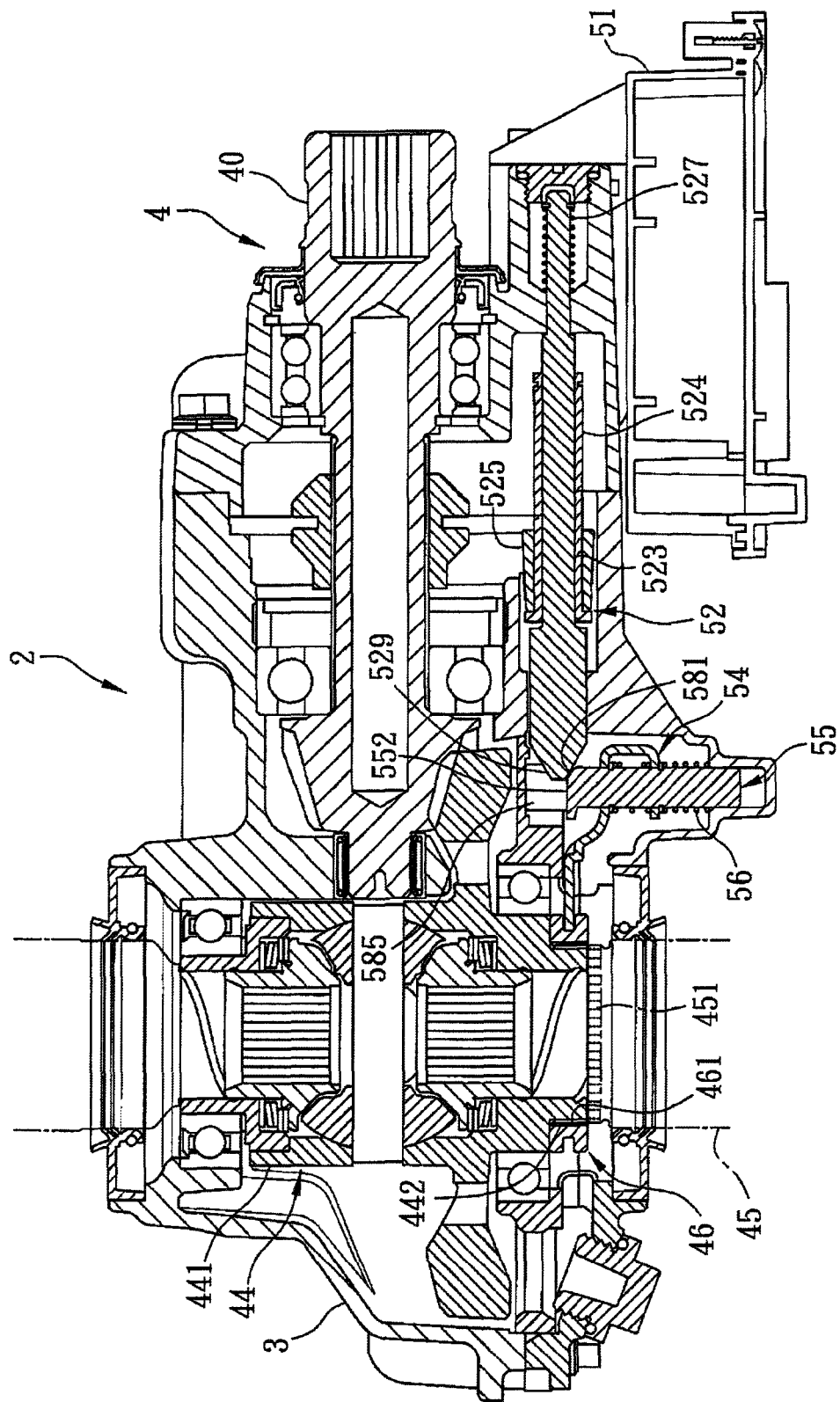
FIG. 15 is a sectional view of the second preferred embodiment of a vehicle power switching device according to this invention, illustrating a first position of a push rod.
Figure 16:
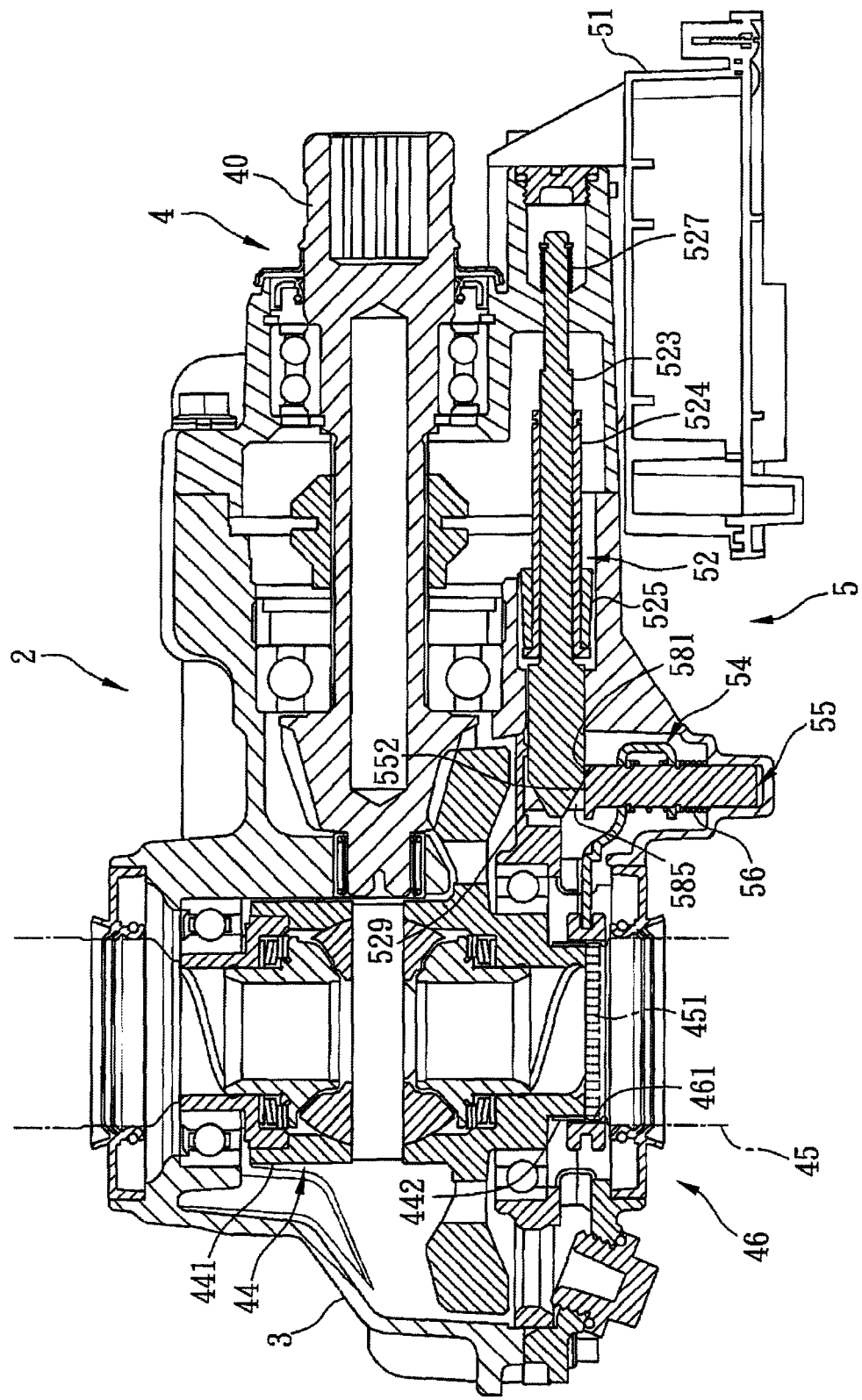
FIG. 16 is a view similar to FIG. 16 but illustrating a second position of the push rod.

With further reference to FIGS. 15 and 16, the second preferred embodiment of a vehicle power switching device 2 according to this invention is similar in construction to the previous preferred embodiment, and differs from the previous preferred embodiment in the following. In this embodiment, the vehicle power switching device 2 is used for a four-wheel drive vehicle, and an assembly of the input shaft 41, the output shaft 42, the first coupler 43 is replaced with a drive shaft 40. The first-coupler pushing member 526 and the force-storing resilient member 528 are omitted from the first transmission mechanism 52.

During use, the controller 51 can be operated to cooperate with the first returning member 527 to move the push rod 523 between a first position shown in FIG. 15 and a second position shown in FIG. 16. In the first position, the frustoconical outer surface of the driving end portion 529 is in contact with the driven end 552 of the connecting rod 55. In the second position, the whole frustoconical outer surface of the driving end portion 529 of the push rod 523 is disposed above the driven end 552 of the connecting rod 55.

When it is desired to move the push rod 523 from the first position to the second position, the controller 51 is operated to move the movable rod 521, the driving rod 522, the sleeve-pushing member 525, the sleeve 514, and the push rod 523 to the positions shown in FIG. 16, respectively.

When it is desired to return the push rod 523 from the second position to the first position, the controller 51 is operated to move the movable rod 521, the driving rod 522, and the sleeve-pushing member 525 to the positions shown in FIG. 15, respectively. Hence, the push rod 523 is biased by the first returning member 527 to the first position. At the same time, the connecting rod 55 is biased by the second returning member 56 to the position shown in FIG. 15.

When the push rod 523 is disposed at the first position, the axle 45 is disconnected from the differential 44, so that the axle 45 and the differential 44 can rotate at different speeds, and when the push rod 523 is disposed at the second position, the axle 45 is connected with the differential 44, so that the axle 45 and the different 44 rotate at the same speed.

In view of the above, since the differential 44 is controlled easily by a controller 51 that does not necessitate a cable 144 (see FIG. 1) required by the above-mentioned conventional transmission system, it can be locked more effectively. Thus, the object of this invention is achieved.

With this invention thus explained, it is apparent that numerous modifications and variations can be made without departing from the scope and spirit of this invention. It is therefore intended that this invention be limited only as indicated by the appended claims.

We claim:
1. A vehicle power switching device comprising:
a power transmission unit including a differential, an axle aligned with said differential, and a coupler sleeved movably on one of said differential and said axle; and
a driving unit including a controller, a first transmission mechanism driven by said controller, and a second transmission mechanism driven by said first transmission mechanism, said controller being one of a solenoid and an electric actuator and being operable to activate said first and second transmission mechanisms to thereby move said coupler to interconnect said differential and said axle, so as to allow for co-rotation of said axle with said differential;
wherein said first transmission mechanism includes a push rod driven by said controller to activate said second transmission mechanism, and a first returning member for biasing said push rod to return to an original position, and said second transmission mechanism includes a coupler pushing member connected to and co-movable with said coupler, a connecting rod driven by said push rod to move said coupler pushing member, a second returning member sleeved on said connecting rod for biasing said connecting rod to an original position, and a prepressing resilient member sleeved on said connecting rod for biasing said coupler to interconnect said differential and said axle.

2. The vehicle power switching device as claimed in claim 1, wherein said push rod is perpendicular to said connecting rod, and has a driving end portion, said connecting rod having a positioning end and a driven end that are opposite to each other, said driving unit further including a guiding mechanism, said guiding mechanism including at least one guiding surface disposed at one of said driving end portion and said driven end and contactable with the other one of said driving end portion and said driven end such that said pushing rod can push and move said connecting rod along a longitudinal direction of said connecting rod, two spaced-apart guiding portions extending from said driven end away from said positioning end, and a positioning ring disposed around a portion of said differential and formed with a guiding groove permitting said guiding portion to extend thereinto, said second guiding portions cooperating with said driven end to define an accommodating space permitting said driving end portion to extend thereinto.

3. The vehicle power switching device as claimed in claim 2, wherein said guiding surface is an inclined surface, and forms an angle smaller than 45° with respect to a central axis of said push rod.

4. The vehicle power switching device as claimed in claim 2, wherein said guiding surface is a curved surface.

5. The vehicle power switching device as claimed in claim 2, wherein said guiding surface is disposed at said driving end portion, and is frustoconical, and said guiding mechanism further includes a guiding wheel disposed on said driven end of said connecting rod and contactable with said guiding surface of said driving end portion.

6. The vehicle power switching device as claimed in claim 2, wherein said second transmission mechanism further includes a positioning unit, said positioning unit including a first positioning flat surface disposed at said connecting rod, and at least one second positioning flat surface disposed at coupler pushing member and in contact with and parallel to said first positioning flat surface.

7. The vehicle power switching device as claimed in claim 1, wherein said differential includes a barrel, each of said barrel and said axle having an externally splined portion, said coupler having an internally splined portion engageable with said externally splined portions of said barrel and said axle.

* * * * *